US012294245B2

(12) United States Patent
Okumatsu (10) Patent No.: US 12,294,245 B2
(45) Date of Patent: May 6, 2025

(54) MOTOR HAVING A PLURALITY OF FIRST MAGNETS AND A PLURALITY OF SECOND MAGNETS ARRANGED IN A HALBACH ARRANGEMENT

(71) Applicant: TOYOTA JIDOSHA KABUSHIKI KAISHA, Toyota (JP)

(72) Inventor: Yoshihiro Okumatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 18/121,830

(22) Filed: Mar. 15, 2023

(65) Prior Publication Data

US 2023/0369926 A1 Nov. 16, 2023

(30) Foreign Application Priority Data

May 11, 2022 (JP) .................................. 2022-078306

(51) Int. Cl.
*H02K 1/2792* (2022.01)
(52) U.S. Cl.
CPC ................... *H02K 1/2792* (2022.01)
(58) Field of Classification Search
CPC .... H02K 1/2792; H02K 1/2766; H02K 1/278; H02K 1/2783
USPC ....................................................... 310/156
See application file for complete search history.

(56) References Cited

U.S. PATENT DOCUMENTS

| 2004/0150283 | A1 | 8/2004 | Calfo et al. | |
|---|---|---|---|---|
| 2005/0040721 | A1* | 2/2005 | Kusase | H02K 1/32 |
| | | | | 310/156.43 |
| 2006/0220484 | A1 | 10/2006 | Stephens | |
| 2016/0126794 | A1* | 5/2016 | Gery | H02K 3/26 |
| | | | | 310/156.01 |
| 2020/0328640 | A1 | 10/2020 | Takahashi et al. | |

FOREIGN PATENT DOCUMENTS

| EP | 2757663 A1 * | 7/2014 | ............. H02K 1/274 |
|---|---|---|---|
| JP | 2004-350427 A | 12/2004 | |
| JP | 2006-288193 A | 10/2006 | |
| JP | 2007-159241 A | 6/2007 | |
| JP | 2019-122237 A | 7/2019 | |

* cited by examiner

*Primary Examiner* — Alexander A Singh
*Assistant Examiner* — Charlie Frank Mann, Jr.
(74) *Attorney, Agent, or Firm* — Dinsmore & Shohl LLP (57) ABSTRACT

A motor according to the present disclosure includes a rotor. The rotor includes a plurality of first magnets arranged in a Halbach arrangement in a circumferential direction of the rotor, and a second magnet. The plurality of first magnets and the second magnets are arranged alternately and adjacent to each other. The second magnet is longer in the circumferential direction of the rotor as compared to the first magnet. The first magnet and the second magnet have a substantially trapezoidal shape when viewed from the rotation axis direction of the rotor.

7 Claims, 10 Drawing Sheets

MOTOR HAVING A PLURALITY OF FIRST MAGNETS AND A PLURALITY OF SECOND MAGNETS ARRANGED IN A HALBACH ARRANGEMENT

CROSS-REFERENCE TO RELATED APPLICATION

This application claims priority to Japanese Patent Application No. 2022-078306 filed on May 11, 2022, incorporated herein by reference in its entirety.

BACKGROUND

1. Technical Field

The present disclosure relates to a motor.

2. Description of Related Art

A motor disclosed in Japanese Unexamined Patent Application Publication No. 2007-159241 (JP 2007-159241 A) includes a rotor that is formed in a Halbach arrangement by four types of inclination direction magnets and two types of circumferential direction magnets. The four types of inclination direction magnets are magnetized in a direction inclined with respect to a radial direction. The two types of circumferential magnets are magnetized in a circumferential direction. The circumferential width of each inclination direction magnet is set to half the circumferential width of the circumferential direction magnet. When the radial widths of the inclination direction magnet and the circumferential direction magnet are t, the magnetization direction of the inclination direction magnet is set so that the inclination angle $\theta$ with respect to the radial direction satisfies $\theta \leq 11.5 \times \ln(t)+1$. Further, the inclination angle $\theta$ is set so as to satisfy $\theta = \{11.5 \times \ln(t)-9\} \pm 2$.

SUMMARY

The present inventors have found the following problems. A motor capable of producing a large torque is required. In such a motor, there is room for study on the torque.

The present disclosure has been made in view of the above-described problems. The present disclosure provides a motor capable of increasing torque.

A motor according to the present disclosure includes a rotor, in which the rotor includes a plurality of first magnets and a plurality of second magnets arranged in a Halbach arrangement in a circumferential direction of the rotor, in which the first magnets and the second magnets are adjacent to each other in an alternating arrangement, in which a second magnet is longer in the circumferential direction of the rotor as compared to a first magnet, and in which the first magnet and the second magnet have a substantially trapezoidal shape when viewed from a rotation axis direction of the rotor.

According to such a configuration, the first magnets and the second magnets have a substantially trapezoidal shape. Therefore, a magnetic flux is easily concentrated in a predetermined direction. As a result, the torque can be increased.

In addition, the first magnet and the second magnet that are adjacent to each other have an upper bottom and a lower bottom longer than the upper bottom, respectively; the upper bottom of the first magnet and the lower bottom of the second magnet extend in the circumferential direction so as to be continuous; the lower bottom of the first magnet and the upper bottom of the second magnet extend in the circumferential direction so as to be continuous; and the upper bottom of the first magnet and the lower bottom of the second magnet are disposed radially inward of the rotor relative to the lower bottom of the first magnet and the upper bottom of the second magnet.

According to such a configuration, the upper bottom of the first magnet and the lower bottom of the second magnet extend that are adjacent extend so as to be continuous. Further, the lower bottom of the first magnet and the upper bottom of the second magnet that are adjacent extend in the circumferential direction so as to be continuous. Therefore, it is possible to further concentrate the magnetic flux. This makes it possible to further increase the torque.

In addition, the first magnet is arranged in the circumferential direction of the rotor and includes a first magnet piece and a second magnet piece that are adjacent to each other; and the first magnet piece and the second magnet piece are magnetized in a direction inclined with respect to the circumferential direction of the rotor.

According to such a configuration, the first magnet piece and the second magnet piece that are adjacent are magnetized in the predetermined direction. Therefore, the magnetic flux is more easily concentrated in the predetermined direction. This makes it possible to further increase the torque.

In addition, the second magnet is magnetized in a radial direction of the rotor. In addition, the second magnet is arranged in the circumferential direction of the rotor and includes a third magnet piece and a fourth magnet piece that are adjacent to each other, and the third magnet piece and the fourth magnet piece are magnetized in a direction inclined with respect to a radial direction of the rotor.

According to such a configuration, the second magnet or the third magnet piece and the fourth magnet piece are magnetized in the predetermined direction. Therefore, the magnetic flux is more easily concentrated in the predetermined direction. This makes it possible to further increase the torque.

According to the present disclosure, it is possible to provide a motor capable of increasing the torque.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Related Technology

Figure 8:
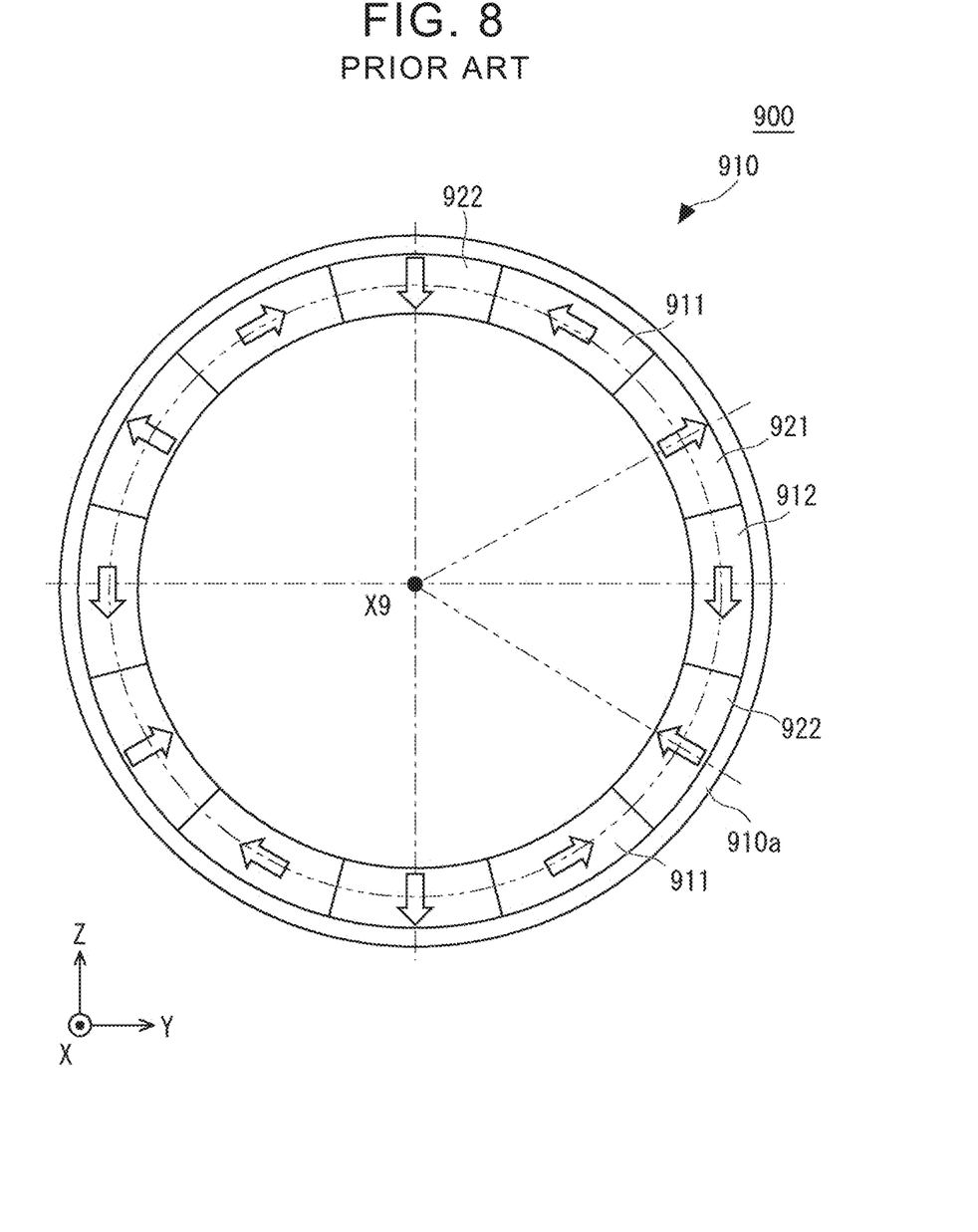
FIG. 8 is a schematic cross-sectional view illustrating a configuration example of a motor according to a problem to be solved by the present disclosure.
Figure 9:
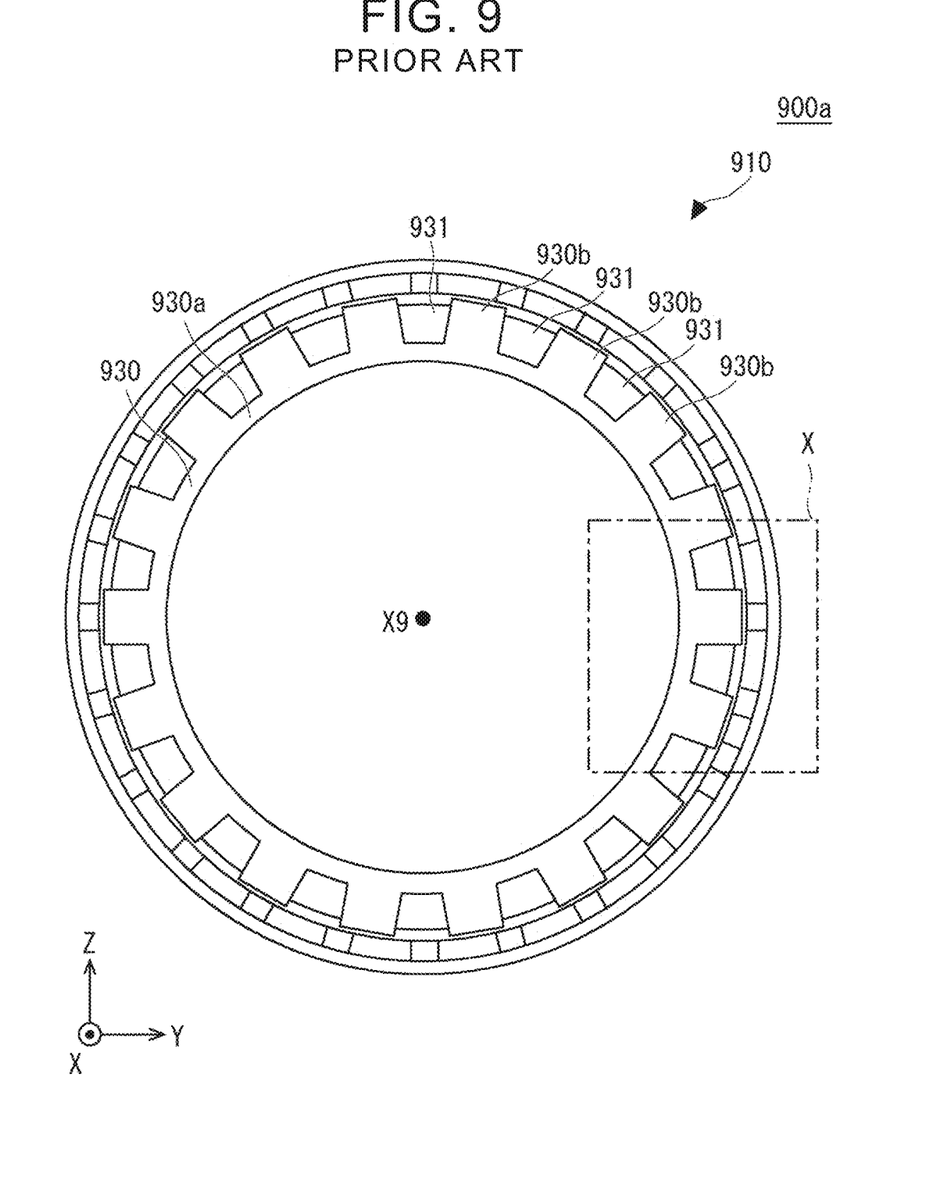
FIG. 9 is a schematic cross-sectional view illustrating a specific example of a motor according to a problem to be solved by the present disclosure.
Figure 10:
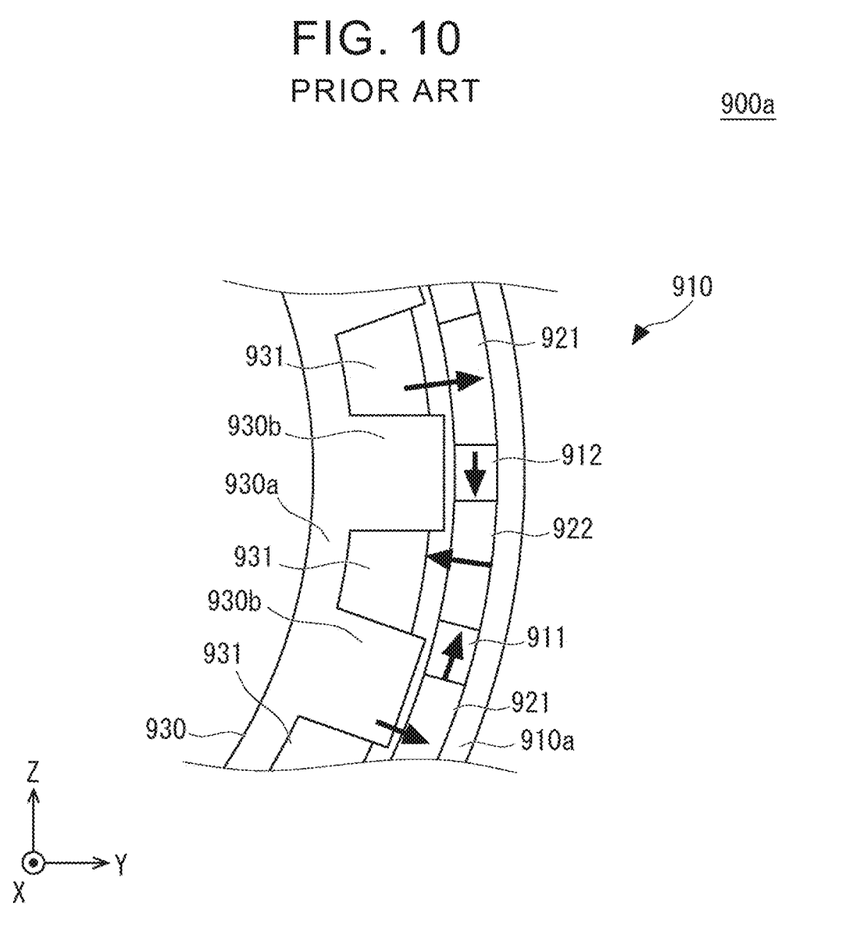
FIG. 10 is a schematic cross-sectional view showing a main part of a specific embodiment of a motor according to the problem to be solved by the present disclosure.

Prior to a specific embodiment to which the present disclosure is applied, a motor according to a problem to be solved by the present disclosure will be described with reference to FIGS. 8 to 10. FIG. 8 is a schematic cross-sectional view illustrating a configuration example of a motor according to a problem to be solved by the present disclosure. FIG. 9 is a schematic cross-sectional view showing a specific example of the motor shown in FIG. 8. FIG. 10 is a schematic cross-sectional view showing a main part of a specific example of the motor shown in FIG. 9.

As shown in FIG. 8, the motor 900 includes a rotor 910. The rotor 910 includes a plurality of magnets 911, 912, 921, and 922 and a rotor body 910a. The rotor body 910a is a cylindrical body or an annular body rotatably held around the rotational axis X9. The rotor body 910a holds a plurality of magnets 911, 912, 921, 922. The plurality of magnets 911, 912, 921, and 922 are arranged in a Halbach arrangement in the circumferential direction of the rotor 910. Specifically, a magnet 911, and the magnet 921, and the magnet 912, and the magnet 922, are arranged in this order in the circumferential direction of the rotor 910. The magnets 911 are magnetized counterclockwise about the rotational axis X9. The magnets 912 are magnetized in a clockwise direction around the rotational axis X9. The magnet 921 is magnetized radially outward of the rotor 910. The magnet 922 is magnetized radially inward of the rotor 910.

The motor 900a shown in FIG. 9 is a specific embodiment of the motor 900. The motor 900a includes a stator 930. The stator 930 includes a stator main body 930a, a plurality of teeth 930b, and a winding 931. The stator main body 930a is a cylindrical body or an annular body. The plurality of teeth 930b protrude radially outward of the stator 930 from the outer periphery of the stator main body 930a. The winding 931 is wound around a plurality of teeth 930b.

As shown in FIG. 10, when viewed from the rotational axis X9 direction of the rotor 910, the magnets 921 and 922 are longer in the circumferential direction of the rotor 910 than the magnets 911 and 912. As described above, the plurality of magnets 911, 912, 921, and 922 are arranged in a Halbach arrangement in the circumferential direction of the rotor 910. Thus, magnetic flux extends from the radially inner side of the rotor 910 to the magnet 921. Also, magnetic flux extends from the magnet 912 in a clockwise direction of the rotor 910. A magnetic flux also extends radially inward of the rotor 910 from the magnet 922. Also, magnetic flux extends from the magnet 911 in a counterclockwise direction of the rotor 910. As a result, the magnetic field is concentrated radially inward of the rotor 910 from the plurality of magnets 911, the magnet 921, the magnet 912, and the magnet 922.

When current is supplied to the winding 931 of the stator 930, a magnetic field is generated. Then, the plurality of magnets 911, the magnet 921, the magnet 912, and the magnet 922 are given a force in the rotation direction of the rotor 910. This causes the rotor 910 to rotate. The motor 900a can then generate torques through the rotor 910.

Hereinafter, specific embodiments to which the present disclosure is applied will be described in detail with reference to the drawings. However, the present disclosure is not limited to the following embodiments. Further, in order to clarify the description, the following description and drawings have been simplified as appropriate.

Embodiment 1

Figure 1:
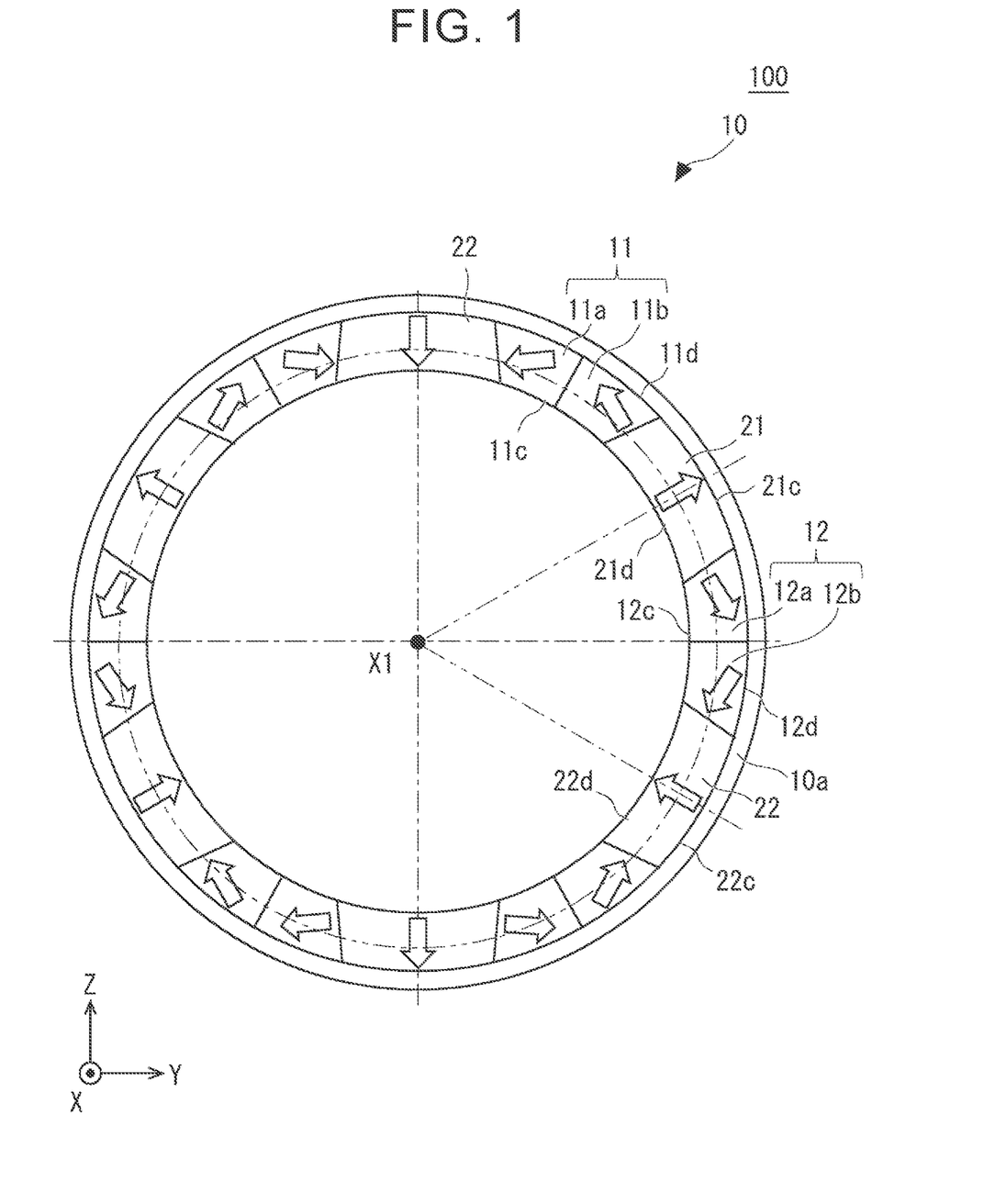
FIG. 1 is a schematic cross-sectional view illustrating a configuration example of a motor according to Embodiment 1.
Figure 2:
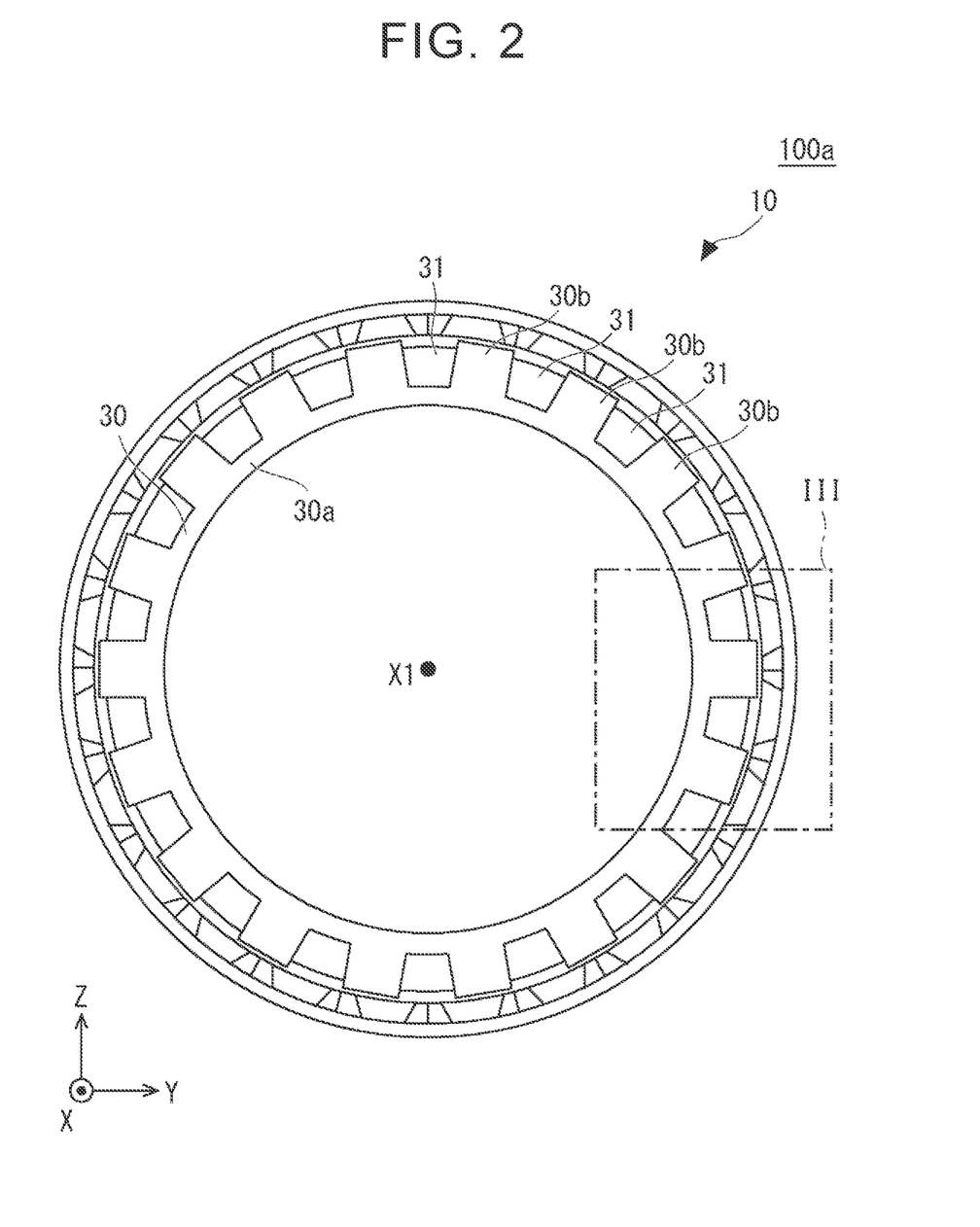
FIG. 2 is a schematic cross-sectional view illustrating a specific example of the motor according to the first embodiment.
Figure 3:
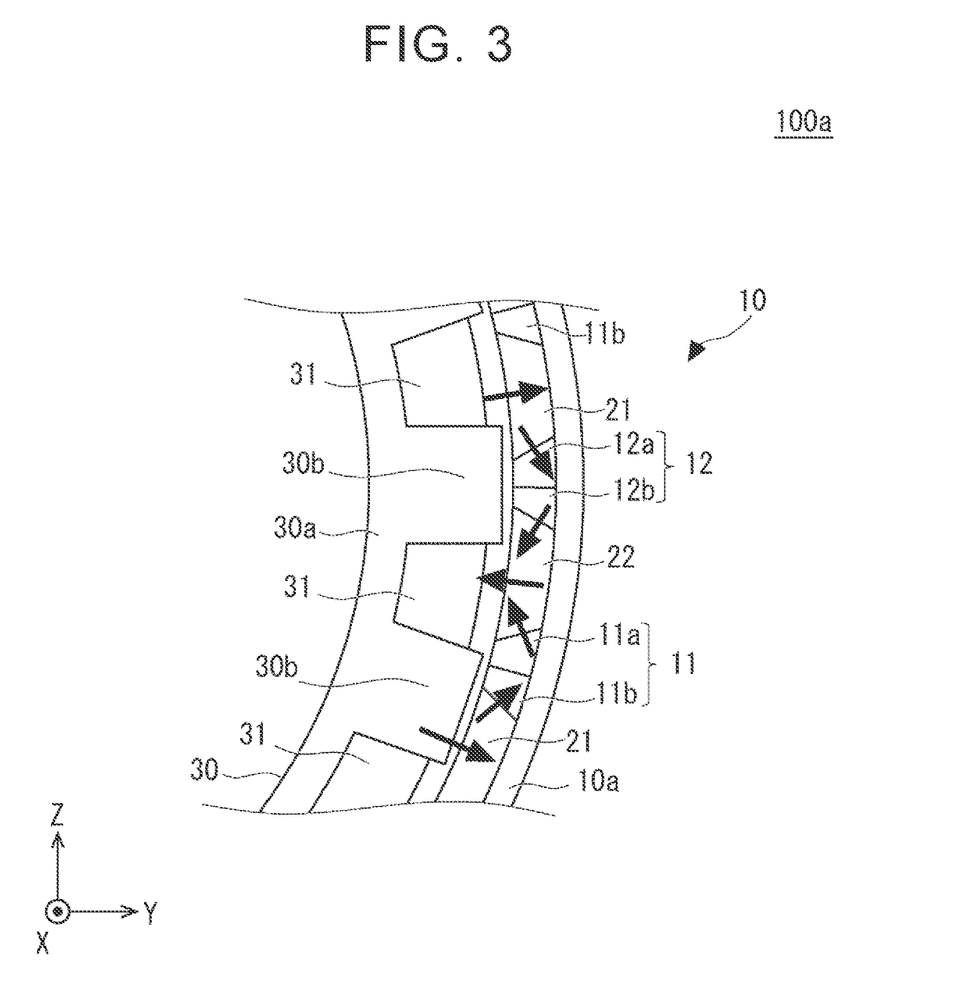
FIG. 3 is a schematic cross-sectional view showing a main part of a specific example of the motor according to the first embodiment.

The first embodiment will be described with reference to FIGS. 1 to 3. FIG. 1 is a schematic cross-sectional view illustrating a configuration example of a motor according to a first embodiment. FIG. 2 is a schematic cross-sectional view showing a specific example of the motor shown in FIG. 1. FIG. 3 is a schematic cross-sectional view showing a main part of a specific example of the motor shown in FIG. 2.

It should be understood that the right-hand xyz co-ordinates shown in FIG. 1 and the remaining drawings are for convenience of describing the positional relation of the constituent elements. Normally, the z-axis plus orientation is vertically upward. Xy plane is a horizontal plane. The fact that the z-axis plus the orientation is vertically upward and xy plane is a horizontal plane is common among the drawings.

As shown in FIG. 1, the motor 100 includes a rotor 10. The rotor 10 includes a plurality of first magnets 11 and 12, a plurality of second magnets 21 and 22, and a rotor body 10a.

The rotor body 10a is a cylindrical body or an annular body rotatably held around the rotational axis X1. The rotor body 10a holds the first magnets 11, 12 and the second magnets 21, 22. An exemplary rotor body 10a shown in FIG. 1 holds three sets of first magnets 11 and 12 and second magnets 21 and 22. However, the numbers of the first magnets 11 and 12 and the second magnets 21 and 22 held by the rotor body 10a are not particularly limited. The number of sets of the first magnets 11, 12 and the second magnets 21, 22 held by the rotor body 10a may be one set or a plurality of sets.

The first magnets 11 and 12 and the second magnets 21 and 22 are arranged in a Halbach arrangement in the circumferential direction of the rotor 10. The first magnets 11, 12 and the second magnets 21, 22 are arranged alternately and adjacent to each other.

Specifically, the first magnet 11, the second magnet 21, the first magnet 12, and the second magnet 22 are arranged in this order in the circumferential direction of the rotor 10.

The first magnets 11 are magnetized counterclockwise about the rotational axis X1. The first magnets 12 are magnetized in a clockwise direction around the rotational axis X1.

More specifically, the first magnets 11 are arranged in the circumferential direction of the rotor 10. The first magnet 11 includes an adjoining first magnet piece 11a and a second magnet piece 11b. The first magnet piece 11a and the second magnet piece 11b are magnetized in a direction inclined with respect to the circumferential direction of the rotor 10. Specifically, the first magnet piece 11a is magnetized in a counterclockwise direction around the rotational axis X1 and in a direction inclined radially inward of the rotor with respect to the circumferential direction of the rotor 10. The second magnet piece 11b is magnetized in a counterclockwise direction around the rotational axis X1 and in a direction inclined radially outward of the rotor 10 with respect to the circumferential direction of the rotor 10.

The first magnets 12 are arranged in the circumferential direction of the rotor 10. The first magnet 12 includes an adjoining first magnet piece 12a and a second magnet piece 12b. The first magnet piece 12a and the second magnet piece 12b are magnetized in a direction inclined with respect to the circumferential direction of the rotor 10. Specifically, the first magnet piece 12a is magnetized in a clockwise direction around the rotational axis X1 and in a direction inclined radially outward of the rotor 10 with respect to the circumferential direction of the rotor 10. The second magnet piece 12b is magnetized in a clockwise direction around the rotational axis X1 and in a direction inclined radially inward of the rotor 10 with respect to the circumferential direction of the rotor 10.

The second magnets 21 and 22 are magnetized in the radial direction of the rotor 10. Specifically, the second magnet 21 is magnetized radially outward of the rotor 10. The second magnet 22 is magnetized inside the rotor 10 in the radial direction.

The second magnets 21, 22 are longer in the circumferential direction of the rotor 10 than the first magnets 11, 12. The first magnets 11 and 12 and the second magnets 21 and 22 have a substantially trapezoidal shape when viewed from the rotational axis X1 of the rotor 10.

The first magnet 11 and the second magnet 21 are adjacent. The first magnets 11 have an upper bottom 11c and a lower bottom 11d. The lower bottom 11d is longer than the upper bottom 11c. The second magnets 21 have an upper bottom 21c and a lower bottom 21d. The bottom 21d is longer than the upper bottom 21c. The upper bottom 11c of the first magnet 11 and the lower bottom 21d of the second magnet 21 extend continuously in the circumferential direction of the rotor 10. The lower bottom 11d of the first magnet 11 and the upper bottom 21c of the second magnet 21 extend continuously in the circumferential direction of the rotor 10. The upper bottom 11c of the first magnet 11 and the lower bottom 21d of the second magnet 21 are disposed radially inward of the rotor 10 rather than the lower bottom 11d of the first magnet 11 and the upper bottom 21c of the second magnet 21.

Similarly, the first magnet 12 and the second magnet 22 are adjacent. The first magnets 12 have an upper bottom 12c and a lower bottom 12d. The lower bottom 12d is longer than the upper bottom 12c. The second magnets 22 have an upper bottom 22c and a lower bottom 22d. The lower bottom 22d is longer than the upper bottom 22c. An upper bottom 12c of the first magnet 12 and a lower bottom 22d of the second magnet 22 extend circumferentially continuously from the rotor 10. The lower bottom 12d of the first magnet 12 and the upper bottom 22c of the second magnet 22 extend circumferentially continuously to the rotor 10. The upper bottom 12c of the first magnet 12 and the lower bottom 22d of the second magnet 22 are disposed radially inward of the rotor 10 rather than the lower bottom 12d of the first magnet 12 and the upper bottom 22c of the second magnet 22.

One Specific Example

The motor 100a shown in FIG. 2 is a specific embodiment of the motor 100. The motor 100a includes a stator 30. The stator 30 includes a stator main body 30a, a plurality of teeth 30b, and a winding 31. Note that hatching of the winding 31 shown in FIG. 2 and other drawings is omitted for the sake of clarity. The stator main body 30a is a cylindrical body or an annular body. The plurality of teeth 30b protrude radially outward of the stator from the outer periphery of the stator main body 30a. The winding 31 is wound around a plurality of teeth 30b. The winding 31 is electrically connected to a power source (not shown) via a conductive wire. The winding 31 is supplied with a current as appropriate.

As shown in FIG. 3, the second magnets 21 and 22 are longer in the circumferential direction of the rotor 10 than the first magnets 11 and 12 when viewed from the rotational axis X1 direction of the rotor 10. As described above, the first magnets 11 and 12 and the second magnets 21 and 22 are arranged in a Halbach arrangement in the circumferential direction of the rotor 10.

A magnetic flux extends from the radially inner side of the rotor 10 to the second magnet 21. Further, the magnetic flux extends from the first magnet piece 12a of the first magnet 12 in a clockwise direction of the rotor 10 and in a direction inclined radially outward of the rotor 10 with respect to the circumferential direction of the rotor 10. The magnetic flux extends from the second magnet piece 12b in a clockwise direction of the rotor and in a direction inclined radially inward of the rotor 10 with respect to the circumferential direction of the rotor 10.

A magnetic flux also extends radially inward of the rotor 10 from the second magnet 22. Further, the magnetic flux extends from the first magnet piece 11a of the first magnet 11 in the counterclockwise direction of the rotor 10 and in a direction inclined radially inward of the rotor 10 with respect to the circumferential direction of the rotor 10. The magnetic flux extends from the second magnet piece 11b in a counterclockwise direction of the rotor 10 and in a direction inclined radially outward of the rotor 10 with respect to the circumferential direction of the rotor 10. As a result, the magnetic field is concentrated radially inward of the rotor 10 from the first magnet 11 and the second magnet 21. A magnetic field is concentrated radially inward of the rotor 10 from the first magnet 12 and the second magnet 22.

When a current is supplied to the winding 31 of the stator 30, a magnetic field is generated. The first magnet 11 and the second magnet 21 are provided with a force in the rotational direction of the rotor 10. The first magnet 12 and the second magnet 22 are provided with a force in the rotational direction of the rotor 10. As a result, the rotor 10 rotates. The motor 100a can then generate torques through the rotor 10.

As described above, according to the configuration of the motor 100a described above, the first magnets 11 and 12 and the second magnets 21 and 22 have a substantially trapezoidal shape. The magnetic flux tends to concentrate on the radially inner side of the rotor 10. As a result, the torque can be increased.

Further, according to the configuration of the motor 100a, the upper bottom 11c, 12c of the first magnets 11 and 12 and the lower bottom 21d, 22d of the second magnets 21 and 22 adjoining each other extend circumferentially continuously. Further, the lower bottom 11d, 12d of the first magnets 11 and 12 and the upper bottom 21c, 22c of the second magnets 21 and 22 adjoining each other extend circumferentially continuously. The first magnet piece 11a, 12a and the second magnet piece 11b, 12b are magnetized in a predetermined direction. Therefore, the magnetic flux is easily concentrated on the radially inner side of the rotor 10. As a result, the torque can be increased.

Embodiment 2

Figure 4:
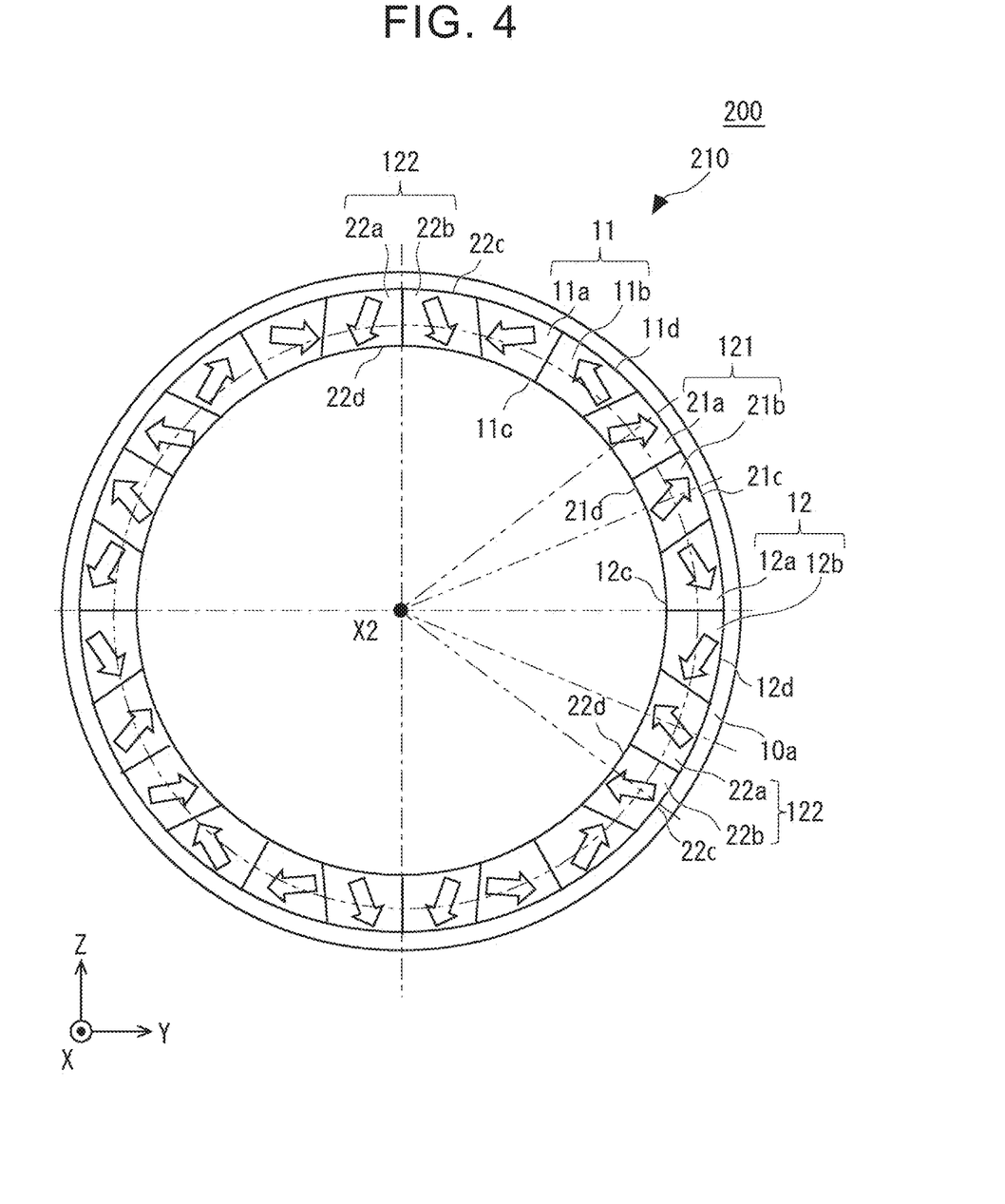
FIG. 4 is a schematic cross-sectional view illustrating a configuration example of a motor according to Embodiment 2.
Figure 5:
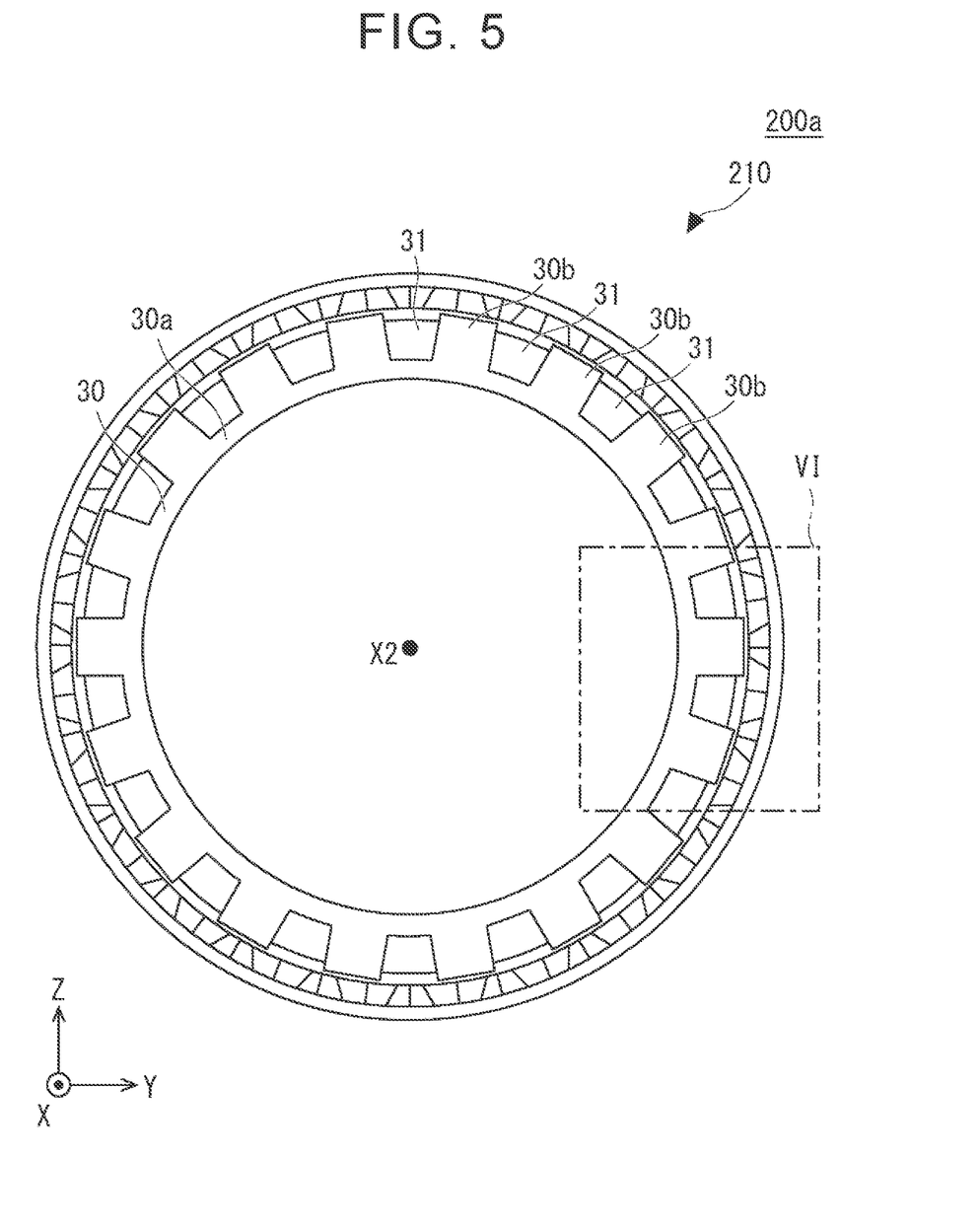
FIG. 5 is a schematic cross-sectional view illustrating a specific example of the motor according to the second embodiment.
Figure 6:
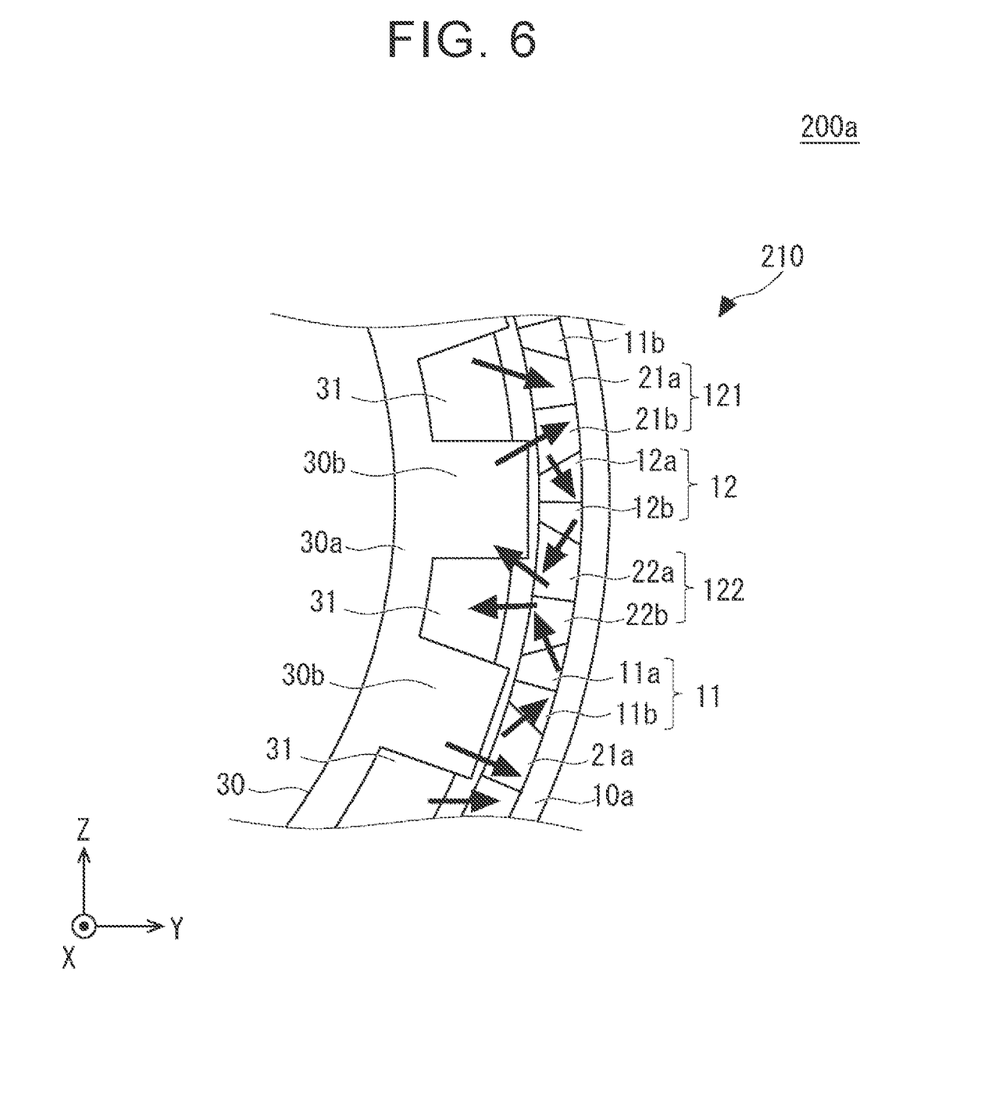
FIG. 6 is a schematic cross-sectional view showing a main part of a specific example of the motor according to the second embodiment.

Embodiment 2 will be described with reference to FIGS. 4 to 6. FIG. 4 is a schematic cross-sectional view illustrating a configuration example of a motor according to Embodiment 2; FIG. 5 is a schematic cross-sectional view showing a specific example of the motor shown in FIG. 4. FIG. 6 is a schematic cross-sectional view showing a main part of a specific example of the motor shown in FIG. 5. The motor 200 according to the second embodiment has the same configuration as the motor 100 according to the first embodiment except for the second magnets 21 and 22.

The motor 200 comprises second magnets 121, 122. The second magnets 121, 122 have the same configuration as the second magnets 21, 22 except that they comprise a third magnet piece 21a, 22a and a fourth magnet piece 21b, 22b. The first magnet 11, the second magnet 121, the first magnet 12, and the second magnet 122 are arranged in a Halbach arrangement in the circumferential direction of the rotor 10. The first magnet 11, the second magnet 121, the first magnet 12, and the second magnet 122 are arranged alternately and adjacent to each other.

The second magnets 121 are arranged in the circumferential direction of the rotor 10. The second magnet 121 includes an adjoining third magnet piece 21a and a fourth magnet piece 21b. The third magnet piece 21a and the fourth magnet piece 21b are magnetized radially outward of the rotor 10 and in a direction inclined with respect to the radial direction of the rotor 10. Specifically, the third magnet piece 21a is magnetized in a direction inclined in the clockwise direction of the rotor 10 with respect to the radially outer side of the rotor 10 and the radial direction of the rotor 10. The fourth magnet piece 21b is magnetized in a direction inclined in the counterclockwise direction of the rotor 10 with respect to the radial direction of the rotor 10 and the radially outer side of the rotor 10.

The second magnets 122 are arranged in the circumferential direction of the rotor 10. The second magnet 122 includes an adjoining third magnet piece 22a and a fourth magnet piece 22b. The third magnet piece 22a and the fourth magnet piece 22b are magnetized in the radial direction inside the rotor 10 and in the direction inclined with respect to the radial direction of the rotor 10. Specifically, the third magnet piece 22a is magnetized in the radially inner side of the rotor 10 and in a direction inclined with respect to the radial direction of the rotor 10. The fourth magnet piece 22b is magnetized in the radially inner side of the rotor 10 and in a direction inclined with respect to the radial direction of the rotor 10.

One Specific Example

The motor 200a shown in FIG. 5 is a specific embodiment of the motor 200. The motor 200a includes a stator 30, similar to the motor 100 shown in FIG. 2.

As shown in FIG. 6, the second magnets 121 and 122 are longer in the circumferential direction of the rotor 10 than the first magnets 11 and 12 when viewed from the rotational axis X2 direction of the rotor 10. As described above, the first magnets 11 and 12 and the second magnets 121 and 122 are arranged in a Halbach arrangement in the circumferential direction of the rotor 10.

The magnetic flux extends from the radially inner side of the rotor 10 to the third magnet piece 21a of the second magnet 121 and in a direction inclined in the clockwise direction of the rotor 10 with respect to the radial direction of the rotor 10. The magnetic flux extends from the radially inner side of the rotor 10 to the fourth magnet piece 21b and in a direction inclined in the counterclockwise direction of the rotor 10 with respect to the radial direction of the rotor 10.

Further, the magnetic flux extends from the third magnet piece 22a of the second magnet 122 in a direction inclined in the radial direction of the rotor 10 and in a direction inclined in the counterclockwise direction of the rotor 10 with respect to the radial direction of the rotor 10. The magnetic flux extends from the fourth magnet piece 22b in a direction inclined in the radial direction of the rotor 10 and in a direction inclined in the clockwise direction of the rotor 10 with respect to the radial direction of the rotor 10.

Similarly to the motor 100a shown in FIG. 3, the magnetic flux extends from the first magnet piece 12a of the first magnet 12 in the clockwise direction of the rotor 10 and in a direction inclined radially outward of the rotor 10 with respect to the circumferential direction of the rotor 10. The magnetic flux extends from the second magnet piece 12b in a clockwise direction of the rotor 10 and in a direction inclined radially inward of the rotor 10 with respect to the circumferential direction of the rotor 10. Further, the magnetic flux extends from the first magnet piece 11a of the first magnet 11 in the counterclockwise direction of the rotor 10 and in a direction inclined radially inward of the rotor 10 with respect to the circumferential direction of the rotor 10. The magnetic flux extends from the second magnet piece 11b in a counterclockwise direction of the rotor 10 and in a direction inclined radially outward of the rotor 10 with respect to the circumferential direction of the rotor 10.

These magnetic fluxes concentrate the magnetic field radially inward of the rotor 10 from the first magnet 11 and the second magnet 121. These magnetic fluxes concentrate the magnetic field radially inward of the rotor 10 from the first magnet 12 and the second magnet 122.

When a current is supplied to the winding 31 of the stator 30, a magnetic field is generated. Then, the first magnet 11 and the second magnet 121 are given a force in the rotational direction of the rotor 10. The first magnet 12 and the second magnet 122 are provided with a force in the rotational direction of the rotor 10. As a result, the rotor 10 rotates. The motor 200a can then generate torques through the rotor 10.

As described above, the configuration of the motor 200a is the same as that of the motor 100a shown in FIGS. 2 and 3. Then, the magnetic flux easily concentrates on the radially inner side of the rotor 10. As a result, the torque can be increased.

The above-described configuration of the motor 200a differs from that of the motor 100a. The third magnet piece 21a, 22a of the second magnet 121 and the fourth magnet piece 21b, 22b of the second magnet 122 are magnetized in a predetermined direction. Therefore, the magnetic flux is more easily concentrated on the radially inner side of the rotor 10. As a result, the torque can be increased.

Simulation Results

Next, referring to FIG. 7, the simulated relation between the rotational speed and torque of the motor 100a, 200a according to the first and second embodiments and the comparative example of the motor 900a according to the problem to be solved by the present disclosure will be described.

The first embodiment of the motor 100a shown in FIGS. 2 and 3 was driven at a predetermined rotational speed under a predetermined condition. Then, the change in the torque value was calculated. Similarly, the second embodiment of the motor 200a shown in FIGS. 5 and 6 was driven at a predetermined rotational speed under a predetermined condition. Then, the change in the torque value was calculated. Similarly, Comparative Example 1 of the motor 900a shown in FIGS. 9 and 10 was driven at a predetermined rotational speed under a predetermined condition. Then, the change in the torque value was calculated. FIG. 7 shows a calculated value of torque with respect to the number of revolutions of each motor.

Figure 7:
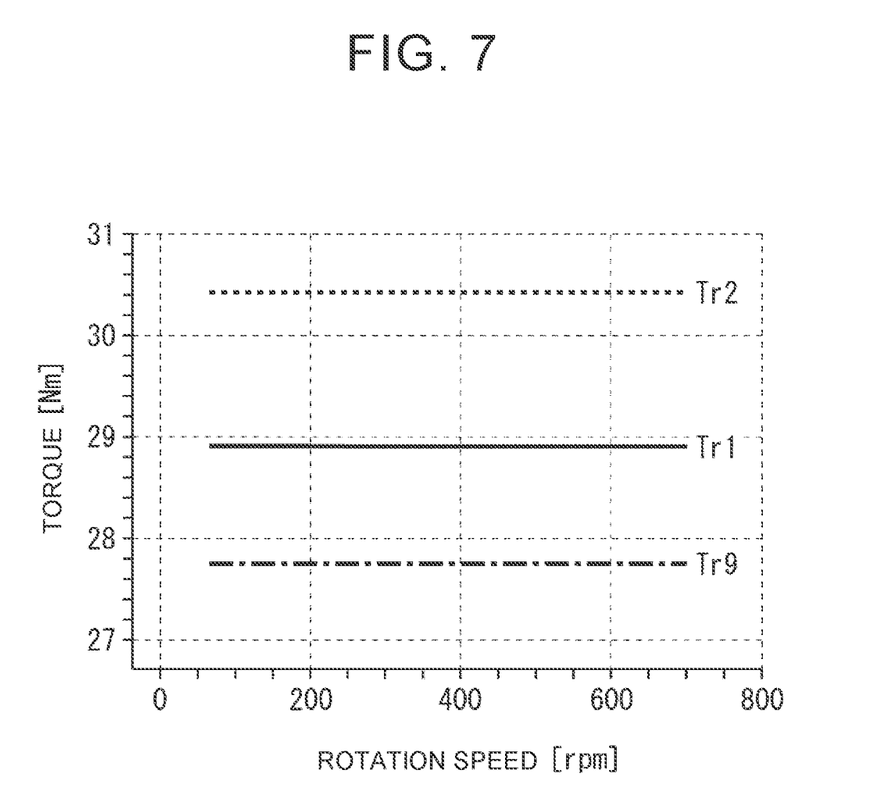
FIG. 7 is a graph showing a calculated value of torque with respect to the number of revolutions of each motor.

As shown in FIG. 7, the torque-value Tr9 of Comparative Example 1 was about 27.8 Nm at a rotational speed of about 50 to 700 rpm. On the other hand, the torque-value Tr1 of the first embodiment was about 28.9 Nm at a rotational speed of about 50 to 700 rpm. The torque-value Tr2 of Example-2 was about 30.4 Nm at a rotational speed of about 50 to 700 rpm.

The torque value Tr1 of Example 1 is higher than the torque value Tr9 of Comparative Example 1. The motor of Example 1 can output a higher torque than the motor of Comparative Example 1.

The torque value Tr2 of Example 2 is higher than the torque value Tr9 of Comparative Example 1 and the torque value Tr1 of Example 1. The motor of Example 2 can output a higher torque than the motors of Comparative Example 1 and Example 1.

The motor 100, 100a, the 200, and 200a described above are capable of outputting a large torque. Therefore, the above-described motor may be mounted on a device that is required to have a high output, for example, a robot, a vehicle, a drone, an electric airplane, or the like. Such a robot can be used in a wide range of applications. Such a robot is, for example, an industrial robot, a cooperative robot, or the like.

Note that the present disclosure is not limited to the above-described embodiments. The present disclosure can be appropriately modified without departing from the spirit thereof. In addition, the present disclosure may be implemented by appropriately combining the above-described embodiments and one example thereof

What is claimed is:

1. A motor comprising a rotor, wherein:
the rotor includes a plurality of first magnets and a plurality of second magnets arranged in a Halbach arrangement in a circumferential direction of the rotor;
the first magnets and the second magnets are adjacent to each other in an alternating arrangement;
a second magnet is longer in the circumferential direction of the rotor as compared to a first magnet;
the first magnet and the second magnet have a substantially trapezoidal shape when viewed from a rotation axis direction of the rotor;
the first magnet is arranged in the circumferential direction of the rotor and includes a first magnet piece and a second magnet piece, the first magnet piece abuts the second magnet piece; and
the first magnet piece and the second magnet piece are magnetized in a direction inclined with respect to the circumferential direction of the rotor.

2. The motor according to claim 1, wherein:
the first magnet and the second magnet that are adjacent to each other have an upper bottom and a lower bottom longer than the upper bottom, respectively;
the upper bottom of the first magnet and the lower bottom of the second magnet extend in the circumferential direction so as to be continuous;
the lower bottom of the first magnet and the upper bottom of the second magnet extend in the circumferential direction so as to be continuous; and
the upper bottom of the first magnet and the lower bottom of the second magnet are disposed radially inward of the rotor relative to the lower bottom of the first magnet and the upper bottom of the second magnet.

3. The motor according to claim 1, wherein the second magnet is magnetized in a radial direction of the rotor.

4. The motor according to claim 1, wherein:
the second magnet is arranged in the circumferential direction of the rotor and includes a third magnet piece and a fourth magnet piece, the third magnet piece abuts the fourth magnet piece; and
the third magnet piece and the fourth magnet piece are magnetized in a direction inclined with respect to a radial direction of the rotor.

5. The motor according to claim 1, wherein:
the first magnet piece is magnetized from the first magnet piece in a counterclockwise direction of the rotor; and
the second magnet piece is magnetized from the second magnet piece in the counterclockwise direction of the rotor.

6. The motor according to claim 1, wherein:
a magnetic flux of the first magnet piece extends in a counterclockwise direction of the rotor and in a direction inclined radially inward of the rotor with respect to the circumferential direction of the rotor; and
a magnetic flux of the second magnet piece extends in a counterclockwise direction of the rotor and in a direction inclined radially outward of the rotor with respect to the circumferential direction of the rotor.

7. The motor according to claim 1, wherein:
a magnetic flux of the first magnet piece extends in a counterclockwise direction of the rotor and in a direction inclined radially inward of the rotor with respect to the circumferential direction of the rotor;
a magnetic flux of the second magnet piece extends in a counterclockwise direction of the rotor and in a direction inclined radially outward of the rotor with respect to the circumferential direction of the rotor;
the second magnet is arranged in the circumferential direction of the rotor and includes a third magnet piece and a fourth magnet piece, the third magnet piece abuts the fourth magnet piece;
the third magnet piece and the fourth magnet piece are magnetized in a direction inclined with respect to a radial direction of the rotor;
a magnetic flux of the third magnet piece extends radially inward of the rotor with respect to the circumferential direction of the rotor and in a direction inclined in a counterclockwise direction of the rotor;
a magnetic flux of the fourth magnet piece extends radially inward of the rotor with respect to the circumferential direction of the rotor and in a direction inclined in a clockwise direction of the rotor;
the first magnet and the second magnet abut each other;
the first magnet and the second magnet each have an upper bottom and a lower bottom longer than the upper bottom, respectively;
the upper bottom of the first magnet and the lower bottom of the second magnet extend in the circumferential direction so as to be continuous;
the lower bottom of the first magnet and the upper bottom of the second magnet extend in the circumferential direction so as to be continuous; and
the upper bottom of the first magnet and the lower bottom of the second magnet are disposed radially inward of the rotor relative to the lower bottom of the first magnet and the upper bottom of the second magnet.

* * * * *